Patented Sept. 22, 1942

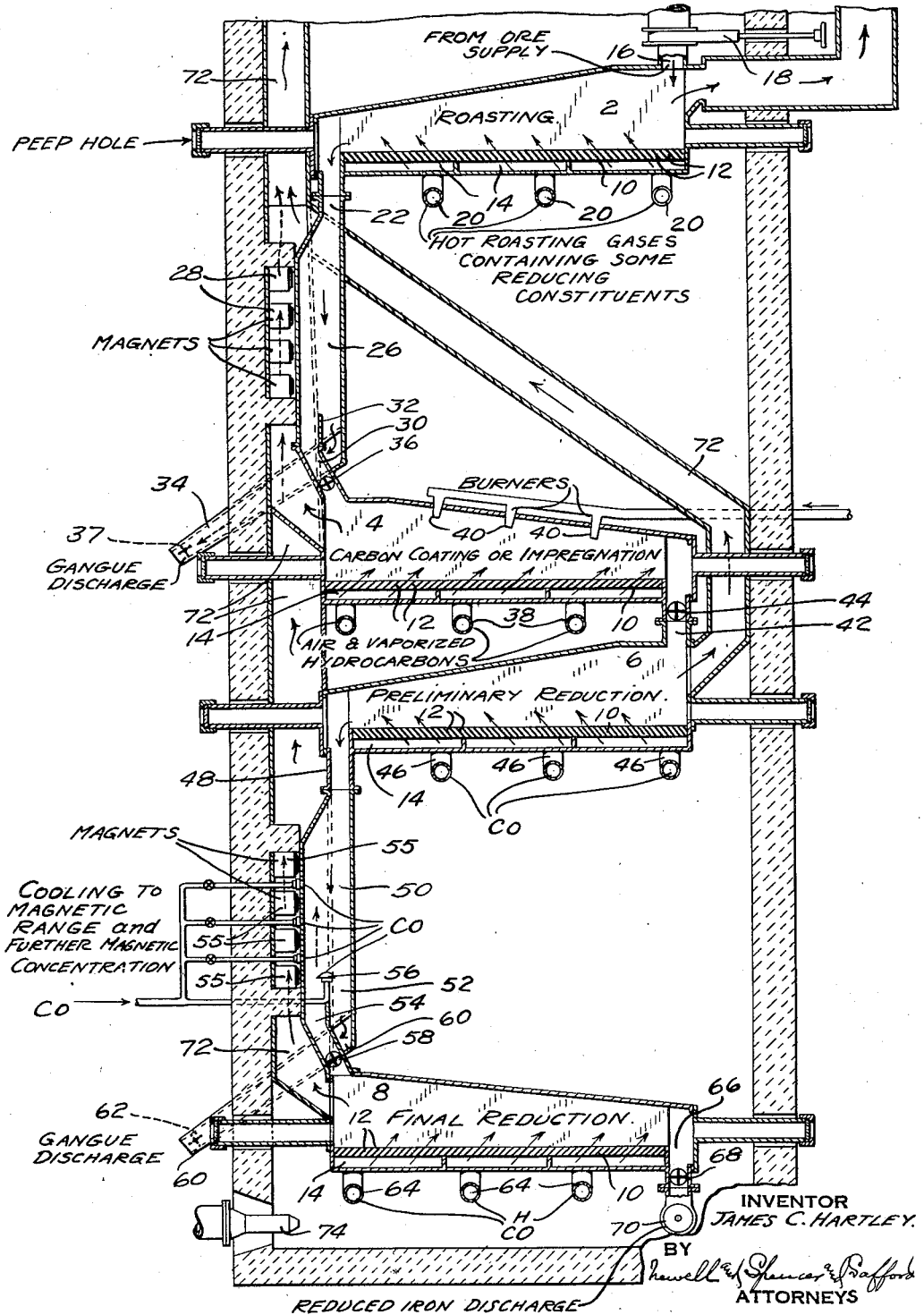

2,296,522

UNITED STATES PATENT OFFICE 2,296,522

PROCESS OF REDUCING METALLIC OXIDES

James C. Hartley, Norwalk, Conn., assignor, by mesne assignments, to Minerals and Metals Corporation, New York, N. Y., a corporation of Delaware Application June 6, 1940, Serial No. 339,095

10 Claims. (Cl. 75—33)

This invention relates to the direct reduction of iron or other metal oxides, and particularly to the production by direct reduction of metals and metal alloys of such purity or predetermined composition that it is possible to employ them directly in the fabrication of finished products, without an intermediate melting or purifying step.

Methods of effecting the direct reduction of ores heretofore employed have been unsuitable for production of the metals on a scale sufficient to supply rolling mills or other forming and fabricating equipment of normal present-day capacity. Moreover, by the methods heretofore employed, it has been necessary, in order to produce a metal approximating the desired purity, to carry out beneficiating treatments for the removal of the gangue from the ore which have involved complicated procedures. In many cases, in order to secure the desired concentration, it has been necessary to carry the material to be concentrated through a multiplicity of re-cycling stages. Even the complicated and extensive concentration methods heretofore employed have not been effective to remove impurities of gangue which are mechanically bound up in the ore grains themselves.

Furthermore, in the direct reduction itself by the methods heretofore employed, in which carbon or carbon monoxide or hydrocarbon gases have been used as reducing agents, the reduction has taken place comparatively slowly and difficulty has been encountered in securing complete reduction. In reduction by carbon and carbon monoxide by the usual procedure of mixing the carbon with the ore, the mixture has to be exposed, for example in a tunnel furnace, for long periods of time under suitable temperature conditions because of the difficulty of eliminating the final oxygen content. While attempts to effect rapid reduction with hydrocarbon gases or liquids have resulted in acceleration of the reduction step, they have, nevertheless, increased the difficulty of producing a completely reduced metal and at the same time have made it difficult, if not impossible, to control the purity of the final product.

With a view to overcoming the difficulties encountered with prior processes of effecting the direct reduction of metal oxides and the production either of substantially pure metals or of metal alloys of predetermined composition, the present invention, among other things, aims to provide a process in which the desired ultimate result may be obtained by the carrying out of some or all of the following steps:

1. Separation of the greater part of the gangue and free impurities from the ore to be reduced by conventional treatments prior to reduction.

2. Effecting coating or impregnation of the partly concentrated ore with carbon obtained from a hydrocarbon liquid or gas and preferably conserving the exhaust gas from the coating or impregnating step for use in a later step of the process.

3. Effecting substantially complete reduction of the ore, thus impregnated or coated with carbon, in a suitable reducing furnace and at a temperature which will not effect reduction of other impurities such as compounds of manganese, titanium, nickel, chromium, etc.

4. Cooling the reduced iron or other metal to the required temperature for the purpose and then effecting another separation of the unreduced impurities which have now been freed from their mechanical bondage in the ore. In the case of iron, the cooling will preferably be carried to the temperature at which iron again becomes magnetic.

5. Then further and completely reducing the now purified and concentrated iron or other metal and in this step, where possible, using as the reducing agent the exhaust gas from the coating or impregnating step, either in the form into which it has been converted by the coating or impregnating step or, where not so directly usable, by reforming it into a suitable reducing agent for this second reduction step.

By proceeding in the foregoing manner, that is, by effecting an approximate concentration before the first reducing step and a substantially complete concentration before the second reducing step, by effecting the first reduction with the reducing agent, in this case carbon, in intimate association with the ore to be reduced, and by completing the reduction in the second reducing step with a reducing agent consisting largely of hydrogen, a product is obtained, particularly when the process is used in the reduction of an oxide of iron, which is a practically pure carbon-free metal, without any excess free carbon or gangue and with no oxide or slag films to prevent its perfect homogenization in the fabricating operation.

In effecting the direct reduction of a metal oxide by the process of the present invention, which, for the purposes of the present disclosure, will be described in its application to the reduction of oxides of iron, the oxide containing ore is first treated by conventional methods of ore beneficiation to separate from the oxide proper the great bulk of gangue and free impurities. If the ore be a magnetite ore, the concentration may be effected by first grinding the ore to the degree of fineness necessary to release the mechanically connected impurities, which may be from 60 to 100 mesh size or even finer, after which the ore can be concentrated by magnetic separation.

If the ore be a hematite ore, which is non-magnetic in its natural state, the oxide therein can be transformed into the magnetic oxide of iron by subjecting it to a reducing roast at a temperature slightly above 750° F. The hematite ore may be subjected to this reducing roast either before or after being ground to the desired degree of fineness for the magnetic concentration, but preferably the grinding is effected first in order to conserve heat, since the temperature at which the reducing roast is carried out is within the magnetic range and therefore the magnetic concentration can be effected after the roasting without an intermediate cooling step. Moreover, the grinding is accomplished more easily before roasting than afterward.

Suitable apparatus in which, with slight modification for carrying out the intermediate concentration steps, the process of this invention may be carried out is shown in my co-pending application Serial No. 338,560, filed June 3, 1940.

In the accompanying drawing is shown, in vertical section, such a modification of the form of apparatus illustrated in Figure 6 of said co-pending application.

In the illustrative apparatus the hematite roast can be carried out in the topmost reaction chamber 2, provision being made for magnetic separation in the passage from this chamber to the chamber 4 next below, where the coating and/or impregnating can be carried out. An additional reduction chamber 8 below the present lowermost chamber of the structure shown in Figure 6 of said co-pending application is provided for the final reduction step with provision in the passage thereto for the second concentration step.

Each of the chambers 2, 4, 6 and 8 is provided with a hearth 10 of the type shown in said co-pending application Serial No. 338,560, that is a hearth having inclined orifices 12 through which gases directed to the under sides of said hearth by manifolds 14 are forced under sufficient pressure to permeate thoroughly the mass of ore or other finely divided material supported on the hearth and to effect an agitation thereof and also a movement thereof over the hearth toward the discharge end of the hearth, this movement naturally being in the direction of inclination of the orifices 12.

The upper chamber 2 may be used for effecting a reducing roast of a hematite ore, for example, to convert it into a magnetic oxide of iron. The ore to be subjected to a reducing roast is introduced, in a finely divided condition and usually at least partially concentrated, into the chamber 2 through a chute 16 upon the right hand end of the hearth 10 of the chamber 2; the delivery of the ore through the chute 16 being controlled in any suitable manner, as, for example, by a gate valve 18. Suitable hot gases containing reducing constituents such as CO for effecting a reducing roast can be delivered to the manifolds 14 through tubes 20 which, in the case of a plurality of hearths arranged side by side, may be connected to cross manifolds not shown. As the finely divided ore, agitated by the roasting and partially reducing gases, moves across the hearth 10 in the chamber 2 from the right hand side thereof to the left hand side thereof, the $Fe_2O_3$ will be converted into $Fe_3O_4$ and will be discharged into the chute 22 which connects the chamber 2 with the chamber 4.

In order to effect a further concentration of the ore before it is prepared for reduction by the carbon coating or impregnation hereinabove referred to, the ore which in any case is now magnetic is subjected to the action of a magnetic field in an enlarged part 26 of the chute 22, this field being produced by electromagnets 28 which draw the now magnetically permeable ore to the left hand side of the chute and therefore into line with the end passage 30 of the chute by which it will be delivered to the chamber 4. The gangue will continue in a straight line into a passage on the right hand side of the partition member 32 into a discharge chute 34. To prevent passage of the gases from the chamber 4 into the chamber 26 and into the chamber 2, the passage is preferably controlled by a star valve 36. A star valve 37 may also be provided in the gangue discharge chute 34.

Concentration having been effected in the manner hereinabove described, the iron oxide to be reduced, which is now, in either case, a magnetic oxide, is then treated to coat it or impregnate it, or both, with carbon, which will preferably constitute the principal reducing agent in the first reducing step of the process. This carbon coating or impregnation, or both, of the finely divided particles of the concentrated ore may be effected in any suitable manner as, for example, by bringing about incomplete combustion of a hydrocarbon fuel within the mass of finely divided ore while agitating the mass to insure complete coating of each of the particles. It may also be brought about, as more fully disclosed in the application of Gilbert D. Dill, Serial No. 335,763, filed May 17, 1940, by taking advantage of the catalytic properties of the oxide to effect a cracking and/or decomposition of a hydrocarbon oil or gas.

Either of the foregoing methods of coating can be carried out in the apparatus herein disclosed. It is probable that both operations will take place in the chamber 4 when hematite ore is roasted in chamber 2 by reason of the fact that the roasted ore, being at a temperature approximately within the cracking range and having considerable catalytic activity at that temperature, will cause some decomposition of the hydrocarbon in addition to that caused by incomplete combustion. When the coating is to be effected primarily by the process of application Serial No. 335,763, some preliminary heating of the hydrocarbon above its vaporizing temperature will usually be advisable and also heating of a magnetite ore when roasting in chamber 2 is not practised.

To effect the incomplete combustion in the chamber 4, vaporized hydrocarbons, mixed with insufficient air for complete combustion, may be delivered to the manifolds 14 through the tubes 38, which, like the tubes 20, may, in the case of multiple hearths, be connected to cross manifolds not shown. To insure combustion in the chamber 4, Bunsen burners 40 may project into said chamber to maintain a continuous igniting flame in the chamber. The coated ore, as it is moved across the hearth 10 of the chamber 4 toward the right hand end thereof, is discharged eventually into a chute 42 controlled by a star valve 44. The chute 42 delivers the coated ore to the right hand end of the hearth 10 in the reduction chamber 6.

The concentrated iron oxide, which has now been coated or impregnated or both coated and impregnated with carbon in a very fine state of division, in fact of a degree of fineness which is almost molecular, is now raised to the reducing temperature in a non-oxidizing atmosphere. If the coating or impregnation has been effected either by partial combustion or by catalytic decomposition of a hydrocarbon in the manner hereinabove set forth, the ore will have had a substantial preheating as an incident to the coating or impregnation. It is of advantage, therefore, to transfer the coated or impregnated oxide substantially directly from the coating apparatus to the reducing chamber or at least in such manner that its heat content is not dissipated. This can conveniently be done, as above described, in the apparatus herein shown.

In order to provide a suitable non-oxidizing atmosphere for the first reduction operation in the apparatus the reaction chamber 6 in which the initial reduction is carried out can be supplied with preheated carbon monoxide gas which, in accordance with the method of operation of the illustrated apparatus, will both help supply the heat for the reduction reaction and effect the agitation of the coated ore necessary to insure substantially complete reduction, such agitation also tending to effect mechanical loosening of impurities that have not been removed in the first concentration. These impurities will, to some extent, be freed from their bondage to the iron as an incident of the removal of the oxygen and the agitation, with its incidental rubbing and impacting action, will serve further to loosen them so that when the second concentration is effected substantially all impurities will be removed.

The coated or impregnated ore may be raised to the reduction temperature by supplying to it some or all of the following, namely, heat received during the coating or impregnation, heat applied to the ore while it is on its way to the reduction chamber, heat carried to it by the preheated agitating CO or other gas and/or heat conducted from an external source through the walls of the reduction chamber. It is usually advantageous, however, to supply a large part of the heat by preheating the gas which is to effect the agitation and also provide the non-oxidizing ore reducing atmosphere.

As the finely divided ore, coated or impregnated with the finely divided carbon, moves across the hearth 10 in the chamber 6 and is thoroughly agitated and heated to the reducing temperature, but below the fusing temperature, by the heated CO introduced into the manifolds 14 of this hearth through the tubes 46 which, like the tubes 20 and 38, may, in the case of multiple hearths, be connected to cross manifolds not shown, the carbon will react with the oxygen of the ore and bring about a substantially complete reduction thereof.

Approximately complete reduction of the iron oxide having been effected in the manner just set forth, with the resultant freeing of impurities which have been mechanically bound up in the iron oxide, the next step will be the removal of the said impurities or the concentration of the iron and any unreduced oxide. The impurities carried over from the first concentration step may comprise, besides ordinary gangue, oxides of other metals such as manganese, titanium, nickel, chromium, etc. To avoid reduction of these, with the resultant difficulty in separating them from the iron, the reduction should be carried out at a temperature which is below the reduction temperature of the oxides of these other metals. The reduction should also be carried out at a temperature below the melting point of the iron and below the melting point of any of the other impurities which may be still associated with the iron oxide after the first concentration step. Suitable temperatures to effect the reduction to obtain these results are between 1400° F. and 1800° F.

In order to bring about the separation of the iron and any still unreduced oxide from the impurities which now have been substantially all freed from their mechanical bondage to the iron and its oxide by the first reduction step, simplest procedure is to cool the charge below the magnetic transformation point of iron and then effect a magnetic separation. However, in the case of non-magnetic ores of other metals the charge may be cooled to a temperature suitable for electrostatic or other beneficiating separation such as air classification, gaseous concentration, table separation, etc.

Since the most convenient and desirable method of effecting the further concentration of a magnetic ore is to subject it to a magnetic concentration and since the reduced iron ore when it leaves the chamber 6 will be at a temperature above the magnetic range, it will be necessary to effect a partial cooling of the reduced product discharged from the chamber 6 in order to bring it within the magnetic range. This may be done in any well known manner as, for example, by passing a neutral or a reducing gas, preferably the latter, through the finely divided ore particles as they are discharged from the hearth 10 of the chamber 6. Cooling by passing cool reducing gases through the reduced ore is old and well known as shown, for example, in U. S. Letters Patent to C. C. Jones No. 1,319,589, granted October 21, 1919, and any invention either in the method or means for cooling the reduced ore or in the method or means for bringing about magnetic concentration herein described, all of which are old, is hereby disclaimed. As herein shown, the ore, as it is discharged from the hearth 10 in the chamber 6, passes into a chute 48 which communicates with an enlarged separating chamber 50 having a discharge passage 52 for the gangue in line with the chute 48 and a passage 54 for the concentrated reduced ore which is pulled into line therewith by the magnets 55. The passage 54 communicates with the final reduction chamber 8.

The gas or gases for cooling the ore to the magnetic temperature may be introduced into the chamber 50 through nozzles 56. Since the chamber 50 communicates with the chamber 6 through the chute 48, the cooling gas used will preferably be the same as that used to heat and agitate the ore on the hearth 10 of the chamber 6, namely, carbon monoxide. To avoid mixture of the gaseous products of the reduction in the chamber 8 with the cooling gas in the separating chamber 50, the passage 54 will preferably be controlled by a star valve 58. Also to avoid loss of the cooling gases the discharge chute 60 will preferably be controlled by star valve 62.

After this second concentration step, which has resulted in removing practically all impurities still associated with the iron and any unreduced oxide thereof, the iron and its unreduced oxide are conducted, preferably in such manner as to conserve the residual heat, into a second reduction chamber 8, in which the reduction is completed, preferably by means of a reducing gas. To avoid carburization of the iron, the second reduction step is preferably carried out with a reducing gas having hydrogen as, at least, one of its constituents. This gas may be the gaseous by-product of the impregnation or coating step, if this by-product has been so converted during this step that it is directly usable as a reducing agent, or it may be this gaseous by-product after it has gone through an additional reforming process in which its constituents have been substantially all converted into CO and H.

In the chamber 8 the concentrated substantially completely reduced ore will, as above suggested, preferably be subjected to reduction by reducing gases, such as hydrogen or carbon monoxide or a mixture of the two, these gases being introduced into manifolds 14 of the hearth 10 of the chamber 8 through tubes 64 which, like the tubes 20, 38 and 46, may, in the case of multiple hearths, be connected to cross manifolds not shown. These reducing gases, preferably preheated to help raise the ore again to the reduction temperature after partial cooling for magnetic separation, will agitate the ore and move it across the hearth 10 while reacting therewith to complete the reduction thereof, thus gradually causing it to move across the hearth to the discharge chute 66, controlled by a star valve 68, through which the finally reduced iron powder may be delivered to a screw conveyor 70 or other suitable means for carrying it to the point of consolidation or cooling or other treatment.

It will be understood that gas for the reduction steps may also be provided by reactivating or regenerating the used gases from the reducing steps and recycling them. To this end these gases may pass into a common flue 72. Moreover, when a hematite ore is being treated the heat for the reducing roast step may be provided by passing through the roating chamber the gaseous products of one of the reduction steps.

The gas supplied to the roasting chamber should preferably contain a considerable proportion of reducing constituents and should be brought to the desired reducing roast temperature. As hereinabove suggested, the reducing roast is preferably carried out at a temperature slightly above 750° F. When, therefore, the gaseous products of one of the reducing steps is employed for the reducing roast, it will usually be necessary to effect a slight cooling thereof before introducing them to the roasting chamber, and this may be effected in any suitable manner as by bringing them into heat-exchanging relation to the incoming ore. If these gaseous products do not still contain sufficient reducing constituents to effect the desired reducing roasting action, such constituents may be added.

Regeneration or reactivation of the gases may be effected in any of the usual ways of effecting such regeneration well known to the art or such regeneration or reactivation may be effected by causing finely divided carbon to be dispersed in the gaseous products of the reduction reaction or of the roasting step, such gaseous products being heated to a temperature at which the dispersed powdered carbon will combine with the $CO_2$ and the $H_2O$ to produce CO and free hydrogen.

What is claimed as new is:

1. Process of directly reducing a metal oxide ore which is capable of approximate reduction by means of solid carbon at temperatures below the fusion temperature of the metal or any associated gangue, which consists in pulverizing the ore and effecting a preliminary concentration of the oxide content thereof, bringing carbon in a very finely divided state into intimate association therewith in such manner that it will be carried by the individual particles of the oxide, raising the carbon-treated oxide, in a non-oxidizing atmosphere, to a temperature at which reduction takes place, but below the melting point of the metal and of any still associated gangue, and effecting an approximately complete reduction of the metal, effecting a further removal of the impurities after said partial reduction and then completing the reduction with a fluid reducing agent.

2. A process according to claim 1 in which a substantial part of the heat required for each subsequent step is brought forward by the material from the preceding step.

3. A process according to claim 1 in which the fluid reducing agent includes hydrogen.

4. A process according to claim 1 in which coating carbon of almost a molecular degree of fineness is obtained by decomposing a hydrocarbon.

5. A process according to claim 1 in which the coating of the oxide is effected by the partial combustion of a hydrocarbon.

6. A process according to claim 1 in which the first reduction step is performed with an accompanying agitation producing rubbing and impacting of the ore particles.

7. A process according to claim 1 in which cooling after the first reduction step is allowed to proceed only so far as is necessary to effect the required concentration for the succeeding reduction step.

8. A process according to claim 1 in which the metal oxide is an iron oxide and in which the further removal of impurities is effected by cooling the partly reduced iron to the magnetic point and effecting magnetic separation.

9. A process according to claim 1 in which the coating of the individual particles of the oxide is effected by decomposition of a hydrocarbon, and in which the gaseous by-products of said decomposition are utilized in the second reducing step.

10. A process according to claim 1 in which a pulverized hematite ore is first roasted to convert it to a magnetic oxide and in which gas both for agitation of the ore and for combustion to furnish roasting heat is obtained from a succeeding reducing step.

JAMES C. HARTLEY.